Patented June 2, 1953

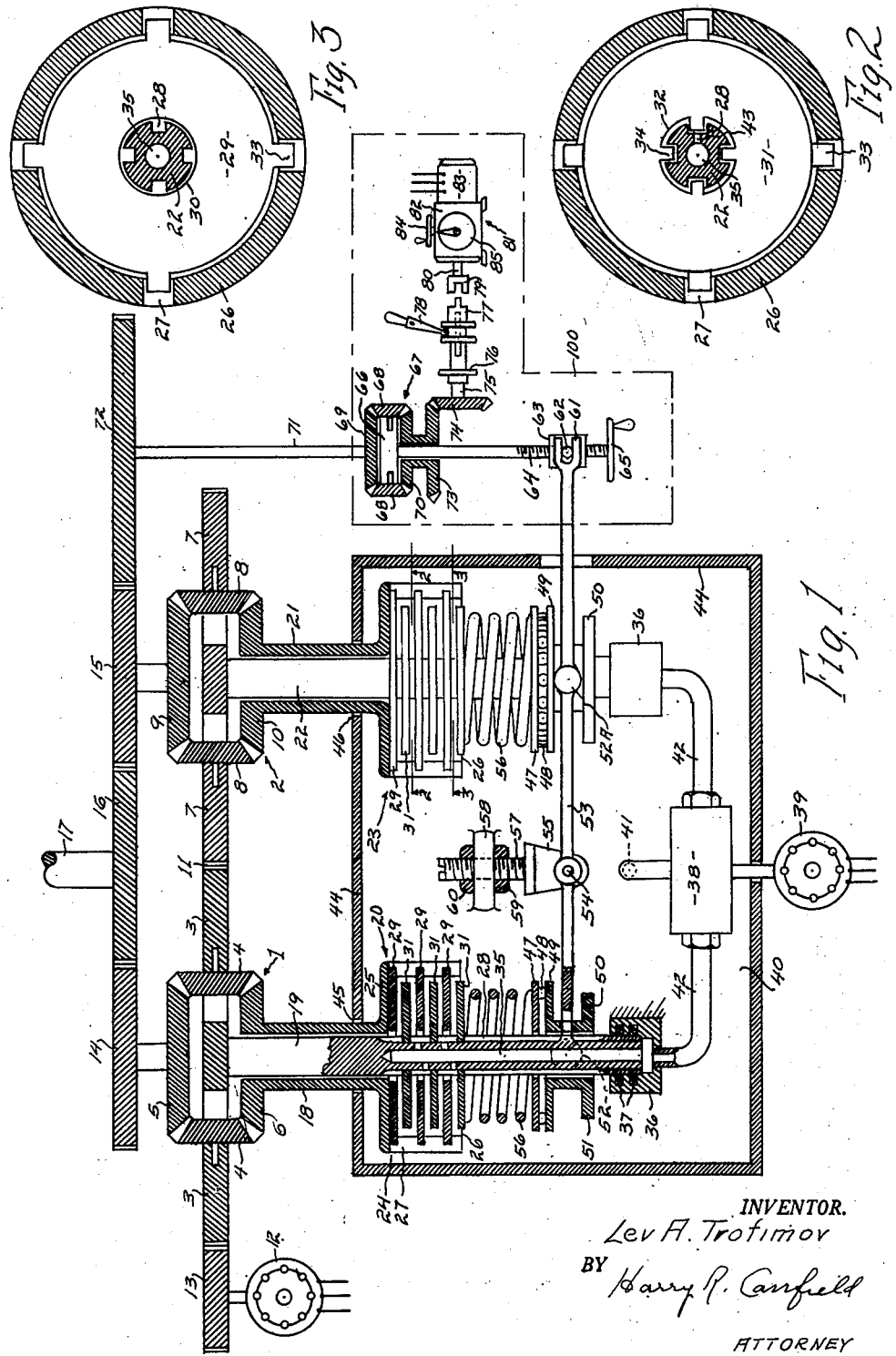

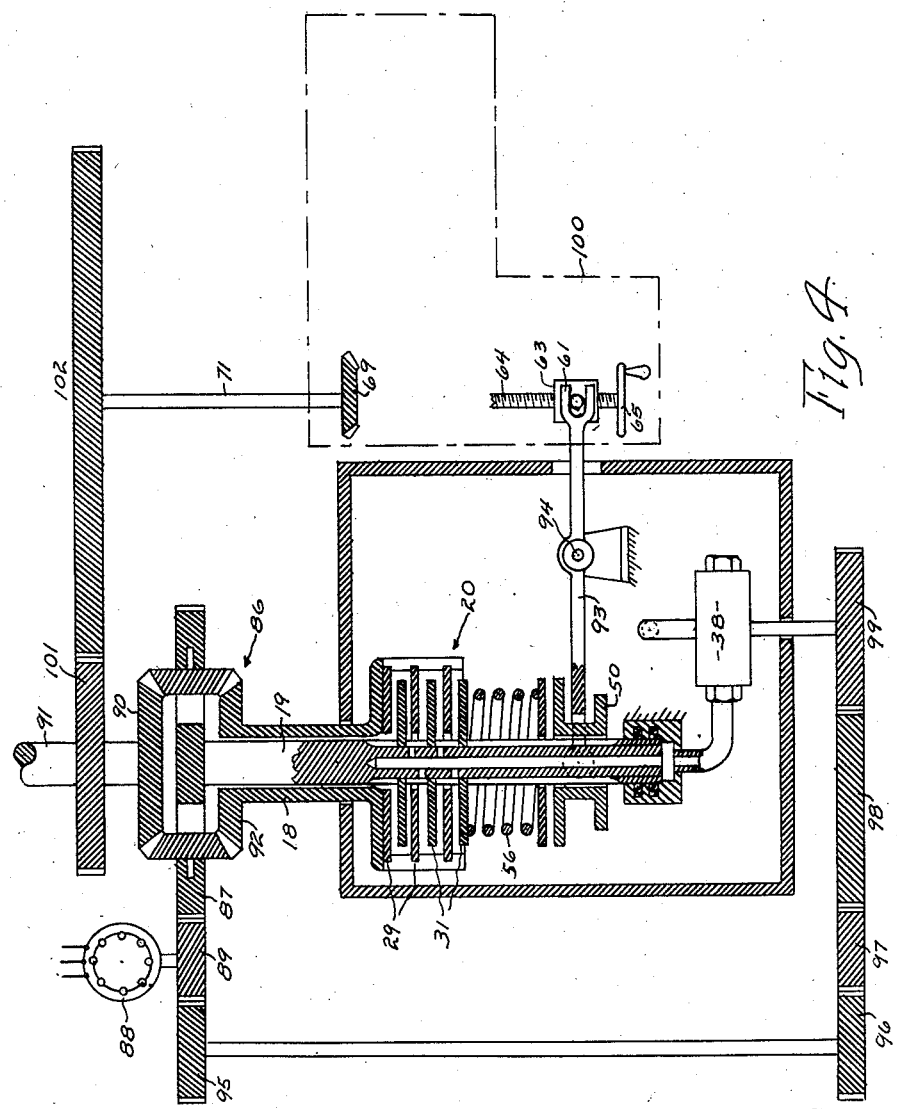

2,640,375

UNITED STATES PATENT OFFICE 2,640,375

HYDRODYNAMIC GEAR TRANSMISSION

Lev A. Trofimov, Willoughby, Ohio

Application March 11, 1949, Serial No. 80,871

6 Claims. (Cl. 74—750)

This invention relates to power transmissions and particularly to power transmissions for transmitting to a load, the power of a motor which runs continuously at full speed or at high-power efficient speed; the control of the transmitted speed being effected by control of the transmission as distinguished from control of the motor.

The invention is adaptable to drive loads which are to be started and driven at constant speed, or at variable speed, in one direction; or in either the forward or the reverse direction, and brought to rest from either direction; and to loads of either the overhauling or the non-overhauling type; and to loads that are to be started and moved to a desired position and brought to rest in that position; and to moving loads that are to be quickly braked to stop them.

In one form, the transmission of the invention comprises in general, a power output element or shaft; differential gearing driven by the continuously running motor; and hydrodynamic means developing torque upon which the gearing reacts, and which is variable by a control; and the output element is driven in one direction and at speeds corresponding to the amount of developed torque.

In the preferred form, the invention comprises a double differential gearing, and a pair of hydrodynamic means developing two torques upon which the gearing reacts; and which, when the torques are equal or balanced, holds the output element at rest; and when unbalanced, or one or the other predominates, causes the output shaft to rotate in one direction or the other accordingly, and at speed commensurable with the degree of unbalance.

A part of the invention resides in the improved means for developing hydrodynamic torque for the purposes mentioned.

The objects of the invention are therefore:

To provide a power transmission having all or at least some of the foregoing features and modes of operation;

To provide in a transmission of the type referred to improved hydrodynamic variable torque developing means, and controls therfor.

The invention is fully disclosed in the following description taken in connection with the accompanying drawing, in which:

Fig. 1 is a view, in some respects diagrammatic, showing an apparatus embodying the invention in one form, the apparatus being partly in longitudinal section;

Fig. 2 is a fragmentary cross sectional view from the plane 2—2 of Fig. 1;

Fig. 3 is a view similar to Fig. 2 but from the plane 3—3 of Fig. 1;

Fig. 4 is a view similar to Fig. 1 but illustrating a modification.

Referring to the drawings Figs. 1, 2, and 3, which as mentioned are in somewhat diagrammatic form, there is shown an embodiment of the invention in which a double differential gearing is utilized comprising a differential gearing 1 and a differential gearing 2.

The gearing 1 comprises a carrier or spider element 3, rotatably supporting a pinion or pinions 4—4 meshing with differential gears 5 and 6.

The gearing 2 comprises similarly a carrier or spider element 7 rotatably supporting a pinion or pinions 8—8 meshing with differential gears 9 and 10.

In this embodiment of the invention, it is contemplated that the spider elements 3 and 7 are to rotate in opposite directions and at equal speeds and to this end are of equal diameter and are provided with gear teeth on the outer peripheries meshed with each other at 11; and it is contemplated that the motor power input is to be at the spider elements 3 and 7; and accordingly a continuously running power supply motor 12 drives a gear 13 meshed with one of the spider elements, for example, the spider element 3.

Connected to the differential gears 5 and 9 respectively are gears or pinions 14—15, meshed with a gear 16 to which is connected the power output element 17, which in this embodiment is a rotary output shaft.

The differential gear 6 is connected to a tubular shaft 18, and the spider element 3 is connected to a shaft 19 coaxial within the tubular shaft 18, and the shafts 18 and 19 are connected to a hydrodynamic torque developing unit shown generally at 20.

The differential gear 10 and the spider element 7 are similarly connected to a hydrodynamic torque developing unit 23 by a tubular shaft 21 and coaxial shaft 22.

Bearings for the gears and shafts above referred to have been omitted in the diagrammatic showing for simplicity, but the same will be understood by those skilled in the art.

The units 20 and 23 will presently be described, but at this point it is to be noted that with the power driven differential gearing thus far described, and with the spiders 3 and 7 driven in opposite directions, the gears 6 and 10 will tend to rotate in opposite directions and if braking or restraining torques were developed on the shafts 18 and 21, they would be in opposite directions and this would cause torques to be developed in opposite directions at the differential gears 5 and 9, and at the gears 14 and 15.

Also, if there is little or no braking or restraining torque on the shafts 18 and 21, they will tend to be driven at equal speeds and at twice the speed of their associated spiders 3 and 7, and there will be little or no torque at the gears 5—14 and 9—15, and the gear 16 and output shaft 17 will remain at rest; but if braking or restraining torque is developed on the shaft 21, or if more torque is developed on the shaft 21 than on the shaft 18, more input torque will be required from the spider 7 to drive the gear 19 than from the spider 3 to drive the gear 6, and the gear 19 and its shaft 21 will slow down, and the gear 6 and its shaft 18 will speed up, and more torque will be developed at the gears 9 and 15 than at the gears 5 and 14; and the gear 15 will rotate the gear 16 and output shaft 17 in a corresponding direction; and the gear 15 will rotate the gears 14 and 5, and this will cause gear 6 to speed up, as stated, and speed up its shaft 18.

As a matter of fact, in the gearing arrangement illustrated, the arithmetical sum of the speeds of the shafts 21 and 18 is always a constant.

If braking or restraining torque were developed on the shaft 18 (instead of on the shaft 21 as described) then the output shaft 17 would be driven in the opposite direction, as is believed will now be clear.

Thus, by developing braking or restraining torques on the shafts 18 and 21, and controlling them to make them equal or to make one predominate over the other the output shaft 17 may be held at rest, or may be driven in either the forward or reverse direction, and in each case at a speed commensurable with the degree to which one torque predominates over the other.

Braking or restraining torque as referred to is developed by the hydrodynamic units 20—23, by developing braking or restraining action on the shafts 18 and 21. These units may be alike and a description of one of them, the unit 20, for example, will suffice.

On the end of the shaft 18 is a coaxial cup-shaped housing 24, having a transverse bottom wall 25, a tubular side wall 26, and slots or radially open keyways 27 in the side wall, four being shown in Figs. 2 and 3.

The shaft 19 extends through the bottom 25 and coaxially through and beyond the tubular wall 26; and has longitudinal keyways 28—28 four being shown in Figs. 2 and 3.

A set of discs 29—29 having central openings 30—30, and a set of discs 31—31 having central openings 32—32, are telescoped by their openings over the shaft 19, discs of one set alternating with discs of the other set, and constituting a tier of discs.

The discs 29—29 have clearance at their central openings with the shaft 19. At their peripheries, they have clearance with the tubular wall 26 and are supported therein and keyed to rotate therewith by peripheral keys or tongues 33—33 extending into the keyways 27; whereby the discs 29 may float axially and without rotating within the housing wall 26.

The discs 31—31 are telescoped on the shaft 19 by their central openings 32—32 and have keys or tongues 34—34 extending into the keyways 28—28 of the shaft, and having clearance therewith; whereby the discs 31—31 may float axially on the shaft and rotate therewith.

The shaft 19 has an axially extending oil duct 35 extending from its outer end to or beyond the innermost disc 29; and at its outer end projects into a housing 36 in which it rotates and to which it is sealed by packing rings 37—37; and a pump 38 driven by a motor 39 draws oil from a reservoir 40 by an intake pipe 41 and supplies it by a pipe 42 to the housing 36 and thence to the shaft duct 35.

The shaft 19 has a plurality of radial branch ducts 43 from the axial duct 35 and these discharge the supplied oil into the said central opening clearance spaces between the shaft and the discs; whence it flows radially outwardly between the discs to the housing wall 26 and out at the radially open keyways 27 and thence falls into the reservoir 40.

The reservoir 40 may conveniently be a housing having an enclosing wall 44 for the units 1 and 2 as plainly shown in Fig. 1, the shafts 18—19 and 21—22 extending through the wall 44 at suitable openings 45—46.

In the arrangement of discs illustrated, one of the discs 29 lies against the housing bottom 25 and one of the discs 31 is at the other or inner end of the tier of discs.

Spaced axially from the tier of discs is a thrust bearing plate 47, rotatable on bearing balls 48 upon one spool head 49 of a spool 50 surrounding the shaft 19 with clearance, and having another spool head 51.

Between the spool heads 49 and 51 is one end 52 of a rocking lever 53, having a pivot bearing 54 at an intermediate point, upon a post 55.

Between and abutting at its ends upon the bearing plate 47 and upon the innermost disc 31 is a spring 56 surrounding the shaft 19.

When the lever 53 is rocked clockwise on its pivot bearing 54, as viewed in Fig. 1, movement of the lever is communicated through the spring to the tier of discs 31—29 to move them closer together; the spring 56 being free to rotate with the disc 31 upon which it abuts, by the bearing 47—48.

As stated, the unit 23 may be, and preferably is, like the unit 20 above described, having an enlargement 52A on the lever 53 in a spool 50 for the same purposes as the end 52 of the lever.

The position of the pivot bearing 54 is made adjustable by providing the bearing post 55 with a threaded stud 57 extending through a plain bore in a post 58 and having nuts 59—60 on opposite sides of the post. By unscrewing one nut and screwing up the other, the position of the pivot bearing 54 may be adjusted.

The oil circulated as described by the pump 38, supplies and maintains oil films between the pairs of adjacent discs, as described, the films being made thinner in the unit 20 and thicker in the unit 23 when the lever 53 is rocked clockwise as viewed in Fig. 1, and vice versa when rocked counterclockwise. The pressure of the oil supplied to the discs at their centers and flowing outwardly over the discs as they rotate tends to separate the discs whereby the thickness of the films always corresponds to the rocked position of the lever 53.

These oils films as will be more fully described are not for merely lubricating the discs, but are thicker than lubricating films, and transmit torque hydrodynamically from one set of discs 29—29 to the other set 31—31.

It is to be noted that the springs 56 are not normally under compression and do not normally exert resilient compressive force on the discs 29—31, nor mutually engage them frictionally except in an extreme condition of operation when it may optionally be desired to substantially lock the discs 31 to the discs 29 by actual pressure contact. These springs therefore are made to a predetermined length such that for an intermediate rocked position of the lever 53, the discs 29—31 will be free to distribute themselves axially and be spaced apart by a predetermined distance or space, corresponding to the thickness of the oil films therebetween.

When the lever 53 is rocked as referred to, the springs 56 will move bodily with the lever without change of length by compression, and the oil being pumped into the spaces between the discs will separate them and provide the torque transmitting films therebetween and the films will accordingly be made thicker or thinner as the case may be.

From the foregoing, it will be apparent that the discs 29 will rotate with the shaft 18 and the discs 31 with the shaft 19 and that the discs 29 will rotate faster than the discs 31. Torque is transmitted through the oil films from one set of discs to the other to provide the braking or restraining torque above referred to on the shafts 18 and 21, for the described purposes.

The utilization of thick oil films (thicker than contact lubricating films) as a medium to transmit torque is in accordance with certain discoveries I have made. I have found that if a film of ordinary lubricating oil is provided between the planar surfaces of plates or discs such as described above, torque will be transmitted through the film from one disc to the other without actual frictional contact between the discs; and that the torque transmitted is commensurable with and varies in accordance with a number of factors as follows.

The thinner the film, the greater the transmitted torque, and vice versa; the more viscous the film the greater the torque and vice versa; and, the greater the difference of speed (slip) between the two surfaces, the greater the torque and vice versa.

With some kinds of oil, the viscosity will vary considerably with temperature, so that I prefer to utilize an oil having the minimum viscosity variation with changes of temperature; and to control the torque transmitting action by controlling the thickness of the film as described. I have found that the transmission of torque occurs within the film and not at the contact of the film with the disc surfaces.

The thickness of the film is varied in the operation of the apparatus as described but in general its average thickness will be of the order of a few thousandths of an inch. It will be apparent therefore that it has been illustrated as magnified in thickness in the drawing, for clear illustrative purposes.

The variable braking or restraining action therefore is not determined by resilient pressure of the springs 56—56 and yielding compression by the springs as above referred to has no part in the braking or restraining action; except in the extreme cases in which it is desired to lock the shafts 18—19, or the shafts 21—22, together to rotate at the same speed for maximum speed of the output shaft, in which case the discs in one unit, say the unit 20, are moved by the arm 53 into actual contact and the spring 56 then comes under compression to provide the locking action.

The springs, therefore, normally act as if they were rigid non-compressible elements in normal operation of the apparatus supplying pressure on the discs to oppose the oil film pressure. The springs can in fact be entirely dispensed with.

There will be a desirable maximum film thickness when the torques developed in the units 20—23 are at the minimum or, are equal, and this film thickness may be determined and set by adjustment of the pivot bearing 54 as will be understood.

As will now be apparent, when the lever 53 is in an intermediate rocked position, hydrodynamic torques developed in the thick oil films between the discs in the units 20 and 23, will cause a braking or restraining torque to be developed on the shaft 19 and a like equal or balanced torque on the shaft 21; and the load shaft 17 will be at rest; and upon rocking the lever 53 in one direction or the other, the torques will be made unequal or unbalanced and the load shaft 17 will be caused to rotate in one direction or the other at a speed determined by the degree of inequality or unbalance.

In general to rock the lever 53 in one direction or the other, it is provided at its free end with a fork 61 engaging a pin 62 on a nut 63 which travels on a screw 64 when the screw is rotated.

The rotation of the screw 64 for the described purposes may be effected by various means to accomplish various load driving purposes and characteristics several of which means being shown in Fig. 1 and either of which may be used optionally; and these will now be described.

The screw 64 has a hand wheel 65 on it at one end for turning it.

The other end of the screw 64 is connected to the spider 66 of a control differential gearing 67. The spider 66 rotatably supports pinions 68—68 meshed with differential gears 69—70. The differential gear 69 is connected by a shaft 71 to a gear 72 driven upon rotation of the output shaft 17, and preferably by meshing it with the gear 15.

The differential gear 70 is connected to a bevel gear 73 meshing with a bevel gear 74 on a shaft 75 to which is connected a hand wheel 76 for turning it.

The shaft 75 extends beyond the hand wheel 76 and has a clutch element 77 splined thereon for axial movement, effected by rocking movement of a pivoted manual lever 78.

A corresponding clutch element 79 is connected to the shaft 80 of a motor driven unit 81. This unit may be any one of the known or commercial units comprising a variable speed transmission 82, an output shaft 80, and a motor 83 for driving the shaft 80 through the transmission 82 and the transmission having adjustable means for varying and setting the speed of the output shaft 80 and for maintaining it constantly at the set speed, in the forward or reverse direction. The transmission 82 illustrated has a hand wheel 84 for adjusting the speed and a dial and scale 85 for indicating the direction and speed for which it is set and a motor 83 for driving it.

Assuming that the load connected to the load shaft 17 is one whose speed and direction are to be controlled by hand, the clutch 77—79 is first disconnected by operating the lever 78. The hand wheel 65 is then turned, in one direction or the other, turning the screw 64 and this as described will cause the output shaft 17 to rotate in one direction or the other, and at a speed proportional to the number of revolutions given to the screw 64 and the corresponding angular extent to which the lever 53 is rocked. To stop the output shaft the screw 64 is rotated back to a neutral position by the hand wheel 65. The load can thus be driven in the forward or reverse direction and at a desired speed in either direction by rotation of the hand wheel 65.

During this hand control, the shaft 75 and hand wheel 76 will be rotated idly through the differential gearing 67, by rotation of the hand wheel 65 or by rotation of the load shaft 17 or both.

Again, if the load on the output shaft 17 is one which it is desired to drive accurately at a constant preselected speed, then the clutch 77—79 would be engaged by the lever 78 and the hand wheel 84 would be turned, to set the transmission 82 to drive its output shaft 75 at a set constant speed. It may be assumed for simplicity that at the time when the clutch 77—79 is engaged, the output shaft is at rest.

The transmission 82 now rotates the shaft 75, gears 74—73, and differential gear 70, the latter at a set speed. The other differential gear 69 is at rest and the gear 70 acting through the pinions 68—68 turns the spider 66 and the screw 64, thereby rocking the lever 53 to cause the output shaft 17 to turn. Rotation of the latter, acting through the gear 72 and shaft 71 turns the differential gear 69 in the direction opposite to the direction of the differential gear 70; and the increasing speed of the gear 69 brings it up to a speed equal to that of the differential gear 70 and thereupon the spider 66 stops rotating and stops rocking of the lever 53, and the output shaft 17 thereafter rotates at the speed which it has by this time attained.

If the output shaft 17 should, because of an increase of load thereon, tend to slow down, this will slow down rotation of the gear 69 and the gear 70 still rotating at its constant set speed will rotate the spider 66 and cause further rocking of the lever 53 to increase the speed of the load shaft and restore it to its preselected speed again. Any tendency of the load shaft to increase in speed is corrected by a similar response in the reverse sense when the gear 69 begins to rotate faster than the gear 70.

The speed of the output shaft can thus be set at a constant speed at any time by rotation of the hand wheel 84 to a corresponding position; and the control will automatically maintain that load speed.

During this control and automatic regulation of speed, the hand wheel 76 will rotate idly continuously; and the hand wheel 65 will rotate idly from time to time as regulating action goes on.

The motor driven transmission 81 may be of very small fractional horsepower, incapable itself of driving the load on the shaft 17, whereby the motor 12 and output shaft 17 and associated elements of the main differential gearing transmission may be of large size able to transmit very great horsepower, the unit 81 being a speed reference unit having only power enough to operate the screw 64.

Again, the output shaft 17 may be connected to a load which is to be moved to a desired position and left in that position. Illustrative of such uses is the positioning of airport wind direction signals or the aiming of guns by motor power. In such a case, the output shaft 17 is to be rotated preferably at high speed for a number of revolutions and then automatically slowed down and stopped. To effect this control the clutch 77—79 is disconnected and the hand wheel 76 is turned. This turns the differential gear 70 and through the pinions 68 turns the spider 66, and the screw 64 turns and this causes the shaft 17 to start and accelerate.

Rotation of the output shaft 17 turns differential gear 69 in the direction to neutralize the effect on the spider 66 of rotation of the differential gear 70. Thus so to speak the differential gear 69 tries to catch up with the differential gear 70. The faster the wheel 76 is turned the more will the speed of differential gear 70 stay ahead of the speed of differential gear 69 and keep the screw 64 turning and keep the lever 53 rocked more and more from its neutral position. There is a speed of rotation for the hand wheel 76 at which the screw 64 will finally become stationary and cause the output shaft 17 to have a corresponding speed. If rotation of the wheel 76 is slowed down below that speed or is stopped altogether, then the speed of the differential gear 69 will catch up with and pass beyond that of the differential gear 70, and turn the screw 64 in the other direction, causing the output shaft 17 to slow down and when the lever 53 has in this manner been brought to its neutral positions, the load shaft 17 will stop.

During this control, the hand wheel 65 rotates idly.

In the case of control by the hand wheels 65 or 76 as described, the load whether it is an overhauling load, as when the load shaft 17 drives a hoist cable drum, or whether it is one moving with inertia, improved dynamic braking may be had by the transmission.

Heretofore dynamic braking has been effected by causing the power input motor itself to act as an electric generator driven by the load. Such prior dynamic braking is highly effective (although requiring complications of electric circuits and contacts to control them) but only at high speeds of the load. As the load is slowed down, the generator is driven more slowly and generates decreasing electric power and decreasing brake torque; and is therefore less effective at low load speeds and become wholly ineffective as the load approaches zero speed, and to stop and hold the load, a supplemental friction brake has had to be added.

In the present invention, to quickly brake and stop an overhauling load or an inertia load, the screw 64 may be rotated to rock the lever 53 to a position at which the applied torque on the output shaft is reversed. This brakes the load and as it slows down and approaches rest, the screw 64 may be returned toward its rotary position at which the torques of the devices 20—23 are equal when the load comes to rest (if it be an inertia load) or stop short of that position so as to maintain a load holding torque (if it be an overhauling load). As much torque as desired may thus be applied to brake the load, from high speed all the way to zero speed, and in fact, if the braking torque thus developed is not removed by return rotation of the screw 64 when the load is braked to rest, it will immediately be reversed under full power and torque, and this latter action which is sometimes wanted corresponds to the action obtained with conventional motor controls and then known as "plugging" the motor.

No elements additional to those described above for power driven loads are required to provide this improved dynamic braking and "plugging" action.

Still another type of control may be effected by the hand wheel 76 with the clutch 77—79 disengaged. Assuming for simplicity that the load is at the time at rest and that the differential gear 69 is at rest, upon turning the hand wheel 76, the differential gear 70 turns and rotates the spider 68 and the screw 64.

This starts and accelerates the load shaft 17 as described; and the differential gear 69 begins to rotate and accelerate. The hand wheel 76 may be turned at a sufficiently high speed so as to cause the screw to be turned a number of revolutions before the differential gear 69 "catches up" with the differential gear 70 so that the output shaft may be caused to attain a desired speed. If now the hand wheel 70 be released, the screw 64 will stay in its moved position corresponding to the desired speed of the output shaft, and the rotating differential gear 69 will rotate the differential gear 70, and, through gears 73—74 will cause the hand wheel 76 to continue to rotate idly. The output shaft will therefore continue to be driven at its desired speed.

To bring the load to rest, the hand wheel 76 may be grasped and its rotation stopped. The rotating gear 69 will then rotate the spider 16 and screw 64 to restore the lever 53 to the position at which the output shaft will come to rest.

If, instead of merely stopping the hand wheel 76, it be rotated in the opposite direction, the screw 64 will be rotated more rapidly to stop the load more quickly, or if the hand wheel 76 be turned fast enough and far enough in the said opposite direction, the output shaft will be stopped by the above described "plugging" action, as will be understood.

Any one of the several controls herein described may be used alone; or any of them in combination with another; the reason for illustrating and describing all of them in one assembly being to simplify the drawing which otherwise would require numerous additional figures.

While in the preferred embodiment of my invention, I utilize a double differential gearing as in Fig. 1, and a hydrodynamic torque developing means for applying braking torques to both gearings to control the speed of the output shaft, the invention may be embodied in another form in which the hydrodynamic torque developing means is applied to a single differential gearing, and this is illustrated in Fig. 4. A briefer description thereof will suffice in view of the foregoing.

The differential gearing 86 comprises a spider 87 driven by a motor through a pinion 89; one differential gear 90 is connected to the output shaft 91; and the other differential gear 92 and the spider 87 are connected respectively by shafts 18—19, to two sets of discs 29—31 of a torque developing device 20 which may be identical with the device 20 of Fig. 1.

A rocker lever 93, pivoted at 94 and having a work 61 at one end engaged by a travelling nut 63 on a screw 64 is engaged at its other end in a spool 50 and when rocked on its pivot changes the thickness of torque transmitting films between the sets of discs 29 and 31 all as in Fig. 1.

In this case, the pump 38 which supplies oil to the discs to provide and maintain the oil films is driven by the motor 88, through gears 95 to 99.

When the lever 93 is rocked counter-clockwise, as viewed in Fig. 4, until the films between the discs are so thick that they transmit no torque, any load connected to the output shaft 91 will hold it at rest. When the lever 93 is rocked clockwise, and reduces the film thickness and thereby as described develops braking torque on the shaft 18 and differential gear 92, the load shaft 91 will be rotated and at a speed commensurable with the torque and the rocked position of the lever 93.

The lever 93 may be rocked by any of the means described for Fig. 1 within the area enclosed by the broken line 100 of Fig. 1; this area being reproduced in Fig. 4; and the parts within it being identified as the same as in Fig. 1 by the screw 64 and the differential gear 69 and shaft 71; the shaft 71 being in this case driven from the output shaft 91 through gears 101—102.

Turning the screw 64 in one direction by any of said means will increase the torque applied to the output shaft 91, and its speed; and turning it in the other direction will decrease the torque and speed. The maximum torque and speed is attained when the discs are moved into actual contact engagement as described for Fig. 1.

The shaft 91 may therefore be controlled as in the form of Fig. 1, but in this case only in one direction of rotation.

This application is a continuation in part of application Serial Number 541,882, filed June 24, 1944, now Patent No. 2,464,275.

I claim:

1. A power transmission comprising a power output element; a pair of differential gearings; each gearing comprising three elements, namely, a rotable spider element rotatably supporting a pinion, and two rotable gears meshed with the pinion; a first element of each gearing adapted to be continuously driven by motor power; a second element of each gearing being connected to the output element by means adapted to apply respective torques oppositely thereto; the third elements of the gearings being continuously driven by the first elements when motor driven; restraining means restraining relative rotation of the first and third elements to cause the second elements to apply torques to the output element as aforesaid, and control means to control the restraining means to control the torques applied to the output element and to balance and unbalance them, to cause the output shaft to have zero speed when the applied torques are balanced and to rotate in forward or reverse direction when the said applied torques are correspondingly unbalanced, and to have a rotational speed determined by the degree of applied torque imbalance; said restraining and control means comprising a pair of relatively-rotable elements for each gearing having mutually confronting faces with a space therebetween, one of the elements of each pair being connected to the corresponding one of the continuously rotating third elements, and the other of the pair connected to the corresponding one of the first elements; means to supply liquid to the said spaces to maintin a torque-transmitting liquid film in each space, and means to increase the thickness of one film relative to that of the other to vary relatively the transmitted torques.

2. A power transmission comprising a power output element; a pair of differential gearings; each gearing comprising three elements, namely, a rotable spider element rotatably supporting a pinion, and two rotable gears meshed with the pinion; a first element of each gearing adapted to be continuously driven by motor power and a second element of each gearing being connected to the output element by means adapted to apply respective torques oppositely thereto; the third elements of the gearings being continuously driven by the first elements when motor driven; restraining means restraining relative rotation of the first and third elements to cause the second elements to apply torques to the output element as aforesaid and control means to control the restraining means to control the torques applied to the output element and to balance and unbalance them, to cause the output shaft to have zero speed when the applied torques are balanced and to rotate in forward or reverse direction when the said applied torques are correspondingly unbalanced, and to have a rotational speed determined by the degree of applied torque imbalance; said restraining and control means comprising a pair of relatively-rotable elements for each gearing having mutually confronting faces with a space therebetween, one of the elements of each pair being connected to the corresponding one of the continuously rotating third elements, and the other of the pair connected to the corresponding one of the first elements; means to supply liquid to the said spaces to maintain a torque-transmitting liquid film in each space, and means to increase the thickness of one film relative to that of the other to vary relatively the transmitted torques, comprising means to adjustably increase the thickness of one film and decrease the thickness of the other, concurrently.

3. A power transmission comprising a power output element; a pair of differential gearings; each gearing comprising three elements, namely, a rotable spider element rotatably supporting a pinion, and two rotable gears meshed with the pinion; a first element of each gearing adapted to be continuously driven by motor power; a second element of each gearing being connected to the output element by means adapted to apply respective torques oppositely thereto; the third elements of the gearings being continuously driven by the first elements when motor driven; restraining means restraining relative rotation of the first and third elements to cause the second elements to apply torques to the output element as aforesaid, and control means to control the restraining means to control the torques applied to the output element and to balance and unbalance them, to cause the output shaft to have zero speed when the applied torques are balanced and to rotate in forward or reverse direction when the said applied torques are correspondingly unbalanced, and to have a rotational speed determined by the degree of applied torque imbalance; said restraining and control means comprising a pair of relatively-rotable elements for each gearing having mutually confronting faces with a space therebetween, one of the elements of each pair being connected to the corresponding one of the continuously rotating third elements, and the other of the pair connected to the corresponding one of the first elements; means to supply liquid to the said spaces to maintain a torque-transmitting liquid film in each space, and means to increase the thickness of one film relative to that of the other to vary relatively the transmitted torques, comprising operable means to move one said face toward and from its confronting face; said operable means being operable optionally to entirely close one said space and lockingly engage the corresponding pair of relatively rotatable elements.

4. A power transmission for continuously applying driving torque of variable amount to a load comprising a power output element; a differential gearing comprising three elements namely: a rotable spider element rotatably supporting a pinion, and two rotable differential gears meshed with the pinion; the spider element adapted to be driven by a continuously running motor; one differential gear connected to the output element; restraining means associated with the other differential gear; comprising a pair of disc-like elements having faces mutually confronting and spaced apart; one disc-like element rotatable by the said other differential gear and the other disc-like element supported so that the one disc-like element rotates relative thereto; means for continuously supplying liquid to the space between the disc faces, and continuously maintaining therebetween a liquid film of torque transmitting thickness; and means to adjustably vary the distance between the disc faces, to adjust the torque continuously developed therebetween, to adjustably vary the torque continuously developed on the said one differential gear.

5. A power transmission for continuously applying driving torque of variable amount to a load comprising a power output element; a differential gearing comprising three elements namely: a spider element rotatably supporting a pinion, and two differential gears meshed with the pinion; a first gearing element adapted to be driven by a continuously running motor; a second gearing element connected to the output element; restraining means associated with the first and third gearing element; comprising a pair of disc-like elements having faces mutually confronting and spaced apart; one disc-like element rotatably driven by the said third gearing element and the other rotatably driven by the motor driven first gearing element; means for continuously supplying liquid to the space between the disc faces, and continuously maintaining therebetween a liquid film of torque transmitting thickness; and means to adjustably vary the distance between the disc faces, to adjust the torque continuously developed therebetween, to vary the torque continuously developed on said second gearing element.

6. A power transmission for continuously applying driving torque of variable amount to a load comprising a power output element; a differential gearing comprising three elements namely: a spider element rotatably supporting a pinion, and two differential gears meshed with the pinion; the spider element adapted to be driven by a continuously running motor; one differential gear connected to the output element; restraining means associated with the other differential gear and the spider element; comprising a pair of disc-like elements having faces mutually confronting and spaced apart; one disc-like element rotatable by the said other differential gear; the other disc-like element driven by the spider element; means for continuously supplying liquid to the space between the disc faces, and continuously maintaining therebetween a liquid film of torque transmitting thickness; and means to adjustably vary the distance between the disc faces, to adjust the torque continuously developed therebetween, to adjustably vary the torque continuously developed on the said one differential gear.

LEV A. TROFIMOV.

References Cited in the file of this patent

UNITED STATES PATENTS

| Number | Name | Date |
|---|---|---|
| 766,314 | Yost | Aug. 2, 1904 |

(Other references on following page)

UNITED STATES PATENTS

| Number | Country | Date |
|---|---|---|
| 923,565 | Newcomb | June 1, 1909 |
| 1,238,447 | Severy | Aug. 28, 1917 |
| 1,707,785 | Clark | Apr. 2, 1929 |
| 1,972,741 | Kohl | Sept. 4, 1934 |
| 1,984,830 | Higby | Dec. 18, 1934 |
| 2,008,869 | Leoni | July 23, 1935 |
| 2,079,724 | Van Ranst | May 11, 1937 |
| 2,120,953 | Bear | June 14, 1938 |
| 2,220,983 | Waters | Nov. 12, 1940 |
| 2,354,597 | Jandasek | July 25, 1944 |

FOREIGN PATENTS

| Number | Country | Date |
|---|---|---|
| 29,510 | Great Britain | Dec. 16, 1909 |
| 401,371 | Great Britain | Nov. 16, 1933 |